US008035854B2

(12) United States Patent
    Watanabe

(10) Patent No.: US 8,035,854 B2
(45) Date of Patent: Oct. 11, 2011

(54) PRINT DATA GENERATING APPARATUS AND COMPUTER USABLE MEDIUM THEREFOR

(75) Inventor: Takeshi Watanabe, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1238 days.

(21) Appl. No.: 11/714,732

(22) Filed: Mar. 7, 2007

(65) Prior Publication Data

US 2007/0216920 A1    Sep. 20, 2007

(30) Foreign Application Priority Data

Mar. 16, 2006    (JP) ................................ 2006-072182

(51) Int. Cl.
    *G06F 15/00*    (2006.01)
(52) U.S. Cl. .......... 358/1.9; 358/3.23; 358/518; 347/15; 347/95; 347/103; 382/162; 382/167
(58) Field of Classification Search .................. 358/1.9, 358/3.23, 518; 347/15, 95, 103; 382/162, 382/167
    See application file for complete search history.

(56) References Cited

U.S. PATENT DOCUMENTS

| 4,630,076 | A |  | 12/1986 | Yoshimura |  |
|---|---|---|---|---|---|
| 5,481,662 | A |  | 1/1996 | Kouyama et al. |  |
| 5,997,132 | A | * | 12/1999 | Smith et al. | 347/43 |
| 6,072,605 | A | * | 6/2000 | Gilman et al. | 358/527 |
| 7,583,421 | B2 | * | 9/2009 | Watanabe | 358/518 |
| 2004/0027416 | A1 |  | 2/2004 | Rosenberger et al. |  |
| 2005/0162451 | A1 | * | 7/2005 | Suzuki et al. | 347/12 |
| 2005/0200679 | A1 |  | 9/2005 | Falser et al. |  |
| 2006/0092457 | A1 | * | 5/2006 | Rhim et al. | 358/1.15 |
| 2006/0188298 | A1 | * | 8/2006 | Aikawa | 399/301 |
| 2006/0250427 | A1 |  | 11/2006 | Kroon et al. |  |
| 2007/0201062 | A1 | * | 8/2007 | Watanabe | 358/1.9 |
| 2007/0216921 | A1 | * | 9/2007 | Watanabe | 358/1.9 |
| 2007/0216924 | A1 | * | 9/2007 | Watanabe | 358/1.9 |
| 2009/0225337 | A1 | * | 9/2009 | Watanabe | 358/1.9 |
| 2009/0237429 | A1 | * | 9/2009 | Watanabe | 347/9 |
| 2009/0237684 | A1 | * | 9/2009 | Watanabe | 358/1.9 |
| 2009/0244568 | A1 | * | 10/2009 | Watanabe | 358/1.9 |
| 2009/0244569 | A1 | * | 10/2009 | Watanabe | 358/1.9 |

FOREIGN PATENT DOCUMENTS

| JP | A 7-110568 | 4/1995 |
|---|---|---|
| JP | A 7-114241 | 5/1995 |
| JP | A 2001-253065 | 9/2001 |
| JP | A 2002-38063 | 2/2002 |
| JP | A 2002-46303 | 2/2002 |
| JP | A 2004-25603 | 1/2004 |
| JP | A 2005-262553 | 9/2005 |

* cited by examiner

*Primary Examiner* — David K Moore
*Assistant Examiner* — Mark Milia
(74) *Attorney, Agent, or Firm* — Oliff & Berridge, PLC

(57) ABSTRACT

A print data generating apparatus to generate print data which is used for printing in a printing apparatus based on image data by using a white colorant and at least one non-white colorant is provided. The print data generating apparatus comprises an image data inputting system, whereby white image data indicating white density levels of an image to be printed is inputted, a colorant data generating system, which generates white colorant data wherein color information of each of a plurality of pixels configuring the white image data is converted into the white colorant level, and a print data generating system, which generates white print data to be used for printing with the white colorant in the printing apparatus based on the white colorant data.

12 Claims, 13 Drawing Sheets

410

| COLOR CONVERSION TABLE |||||||
|---|---|---|---|---|---|---|
| sRGB VALUE ||| CMYK VALUE ||||
| R | G | B | C | M | Y | K |
| 0 | 0 | 0 | 0 | 0 | 0 | 0 |
| 64 | 0 | 0 | 0 | 32 | 45 | 0 |
| 128 | 0 | 0 | 0 | 101 | 123 | 0 |
| 192 | 0 | 0 | 0 | 190 | 210 | 0 |
| 255 | 0 | 0 | 0 | 255 | 250 | 0 |
| 0 | 64 | 0 | 50 | 23 | 10 | 10 |
| 64 | 64 | 0 | 100 | 32 | 45 | 35 |
| 128 | 64 | 0 | 80 | 62 | 70 | 55 |
| 192 | 64 | 0 | 20 | 102 | 190 | 15 |
| 255 | 64 | 0 | 0 | 180 | 250 | 0 |
| ... | ... | ... | ... | ... | ... | ... |
| 0 | 192 | 255 | 255 | 20 | 0 | 0 |
| 64 | 192 | 255 | 190 | 21 | 0 | 0 |
| 128 | 192 | 255 | 128 | 31 | 0 | 0 |
| 192 | 192 | 255 | 54 | 25 | 0 | 0 |
| 255 | 192 | 255 | 0 | 20 | 0 | 0 |
| 0 | 255 | 255 | 255 | 10 | 0 | 0 |
| 64 | 255 | 255 | 198 | 2 | 0 | 0 |
| 128 | 255 | 255 | 130 | 0 | 0 | 0 |
| 192 | 255 | 255 | 55 | 0 | 0 | 0 |
| 255 | 255 | 255 | 0 | 0 | 0 | 0 |

| WHITE CONVERSION TABLE | | | |
|---|---|---|---|
| sRGB VALUE | | | WHITE CONVERSION TABLE |
| R | G | B | W VALUE |
| 0 | 0 | 0 | 0 |
| 64 | 0 | 0 | 30 |
| 128 | 0 | 0 | 100 |
| 192 | 0 | 0 | 150 |
| 255 | 0 | 0 | 255 |
| 0 | 64 | 0 | 32 |
| 64 | 64 | 0 | 120 |
| 128 | 64 | 0 | 145 |
| 192 | 64 | 0 | 180 |
| 255 | 64 | 0 | 255 |
| ... | ... | ... | ... |
| 0 | 192 | 255 | 250 |
| 64 | 192 | 255 | 251 |
| 128 | 192 | 255 | 253 |
| 192 | 192 | 255 | 254 |
| 255 | 192 | 255 | 255 |
| 0 | 255 | 255 | 255 |
| 64 | 255 | 255 | 251 |
| 128 | 255 | 255 | 245 |
| 192 | 255 | 255 | 250 |
| 255 | 255 | 255 | 255 |

FIG. 9

PRINT DATA GENERATING APPARATUS AND COMPUTER USABLE MEDIUM THEREFOR

CROSS REFERENCE TO RELATED APPLICATION

This application claims priority from Japanese Patent Application No. 2006-072182, filed on Mar. 16, 2006, the entire subject matter of which is incorporated herein by reference.

BACKGROUND

1. Technical Field

Aspects of the present invention relate to a print data generating apparatus and print data generating programs therefor capable of creating print data which is used for printing in the printing apparatus, and more specifically, creating print data suitable for a printing operation using white ink in the printing apparatus.

2. Related Art

Conventionally, in an ink-jet printing apparatus that performs recording by ejecting inks onto a recording medium, the inks are ejected from ejecting nozzles, which are provided at an end of ink channels, by leading the inks from ink reservoirs to a plurality of ejecting channels in ink-jet heads, and by selectively activating actuators (e.g., heating elements, piezoelectric elements, and the like). When an image is formed in colors, each of pixels composing the image is resolved, for example, into the three primary colors, which are cyan (C), magenta (M), and yellow (Y), then a colored pixel is formed as the inks adjusted in their densities are ejected onto the recording medium. Also, a pixel which contains black as a component is generally reproduced as a black (K) ink is ejected onto the recording medium.

In recent years, a white ink as well as CMYK inks (hereinafter referred to as "colored inks") has been used so that, for example, a high-quality image in better reproducibility without being bounded by factors of the recording medium such as a color and brightness of the recording medium. Such a use of the white ink is disclosed in Japanese Patent Provisional Publications Nos. HEI7-114241, 2002-38063, 2005-262553, HEI7-110568, 2001-253065, 2002-46303, and 2004-25603 (hereinafter referred to as '241 publication, '063 publication, '553 publication, '568 publication, '065 publication, '303 publication, and '603 publication respectively). According to these techniques, images in higher quality can be achieved by covering a base color of the recording medium with the white ink, and reproducing light colors by adding the white ink to colored inks.

However, according to '241 and '063 publications, printing in the white ink is executed on an entire area or an entire record objective area of the recording medium. Therefore, there has been a problem that an amount of the white ink to be used is increased, therefore it is inefficient for printing speed and print cost.

Further, according to '063, '568, '065, and '303 publications, printing is binary-controlled, and the image is formed based on the control as to whether the white ink is ejected or not on every pixel. However, ejecting the white ink under the binary control cannot reproduce white scales (i.e., gradation) on the recording medium. Therefore, there has been a problem that a pseudo-outline is generated on a border between an area printed in the white ink and an unprinted area, and the image quality is deteriorated. Additionally, when the white ink is ejected onto each pixel, the white ink is ejected uniformly regardless of closeness of the color of the pixels to the base color of the recording medium, thus, the amount of white ink to be used is yet increased.

Furthermore, in the printing apparatuses according to '063, '553, and '065 publications, as to whether the white ink is ejected on each pixel and/or an amount of the white ink to be ejected is determined based on factors such as a color and transparency of the recording medium. However, it is difficult to make an accurate estimate of a color and brightness of each pixel in actual printing of the image by only judging the color and the transparency of the recording medium. Therefore, in order to print a high-quality image using the white ink, a supplier of the printing apparatuses including a manufacturer and a designer has been required to actually execute sample printing on the recording medium and determine a preferable ejecting rate of the white ink (i.e., a white ink level) with respect to each pixel, based on human eye observation.

Furthermore, according to the technique disclosed in '603 publication, an amount of the white ink to be ejected is increased as input levels of the colored inks (CMY) decrease. In this method, if the input levels of the colored inks are high, the amount of the white ink to be ejected decreases, therefore, if the base color of the recording medium is strong, the image quality of printing in the colored inks is deteriorated by the lack of the white ink and the base color of the recording medium affecting the image printed in the colored inks. Thus, similarly to above, it has been difficult to estimate accurately how the color and/or brightness of each pixel in the image as a print output solely by considering the input levels of the colored inks.

SUMMARY

Aspects of the present invention are advantageous in that a print data generating apparatus and a print data generating program therefor which allows an user to create and edit print data to print a high-quality image with excellent in reproducibility without being affected by the recording medium, are provided.

BRIEF DESCRIPTION OF THE ACCOMPANYING DRAWINGS

FIG. 8 shows a data configuration of a color conversion table 410 according to the first embodiment of the invention.

FIG. 9 shows a data configuration of a white conversion table 420 according to the first embodiment of the invention.

DETAILED DESCRIPTION

General Overview

Figure 1:
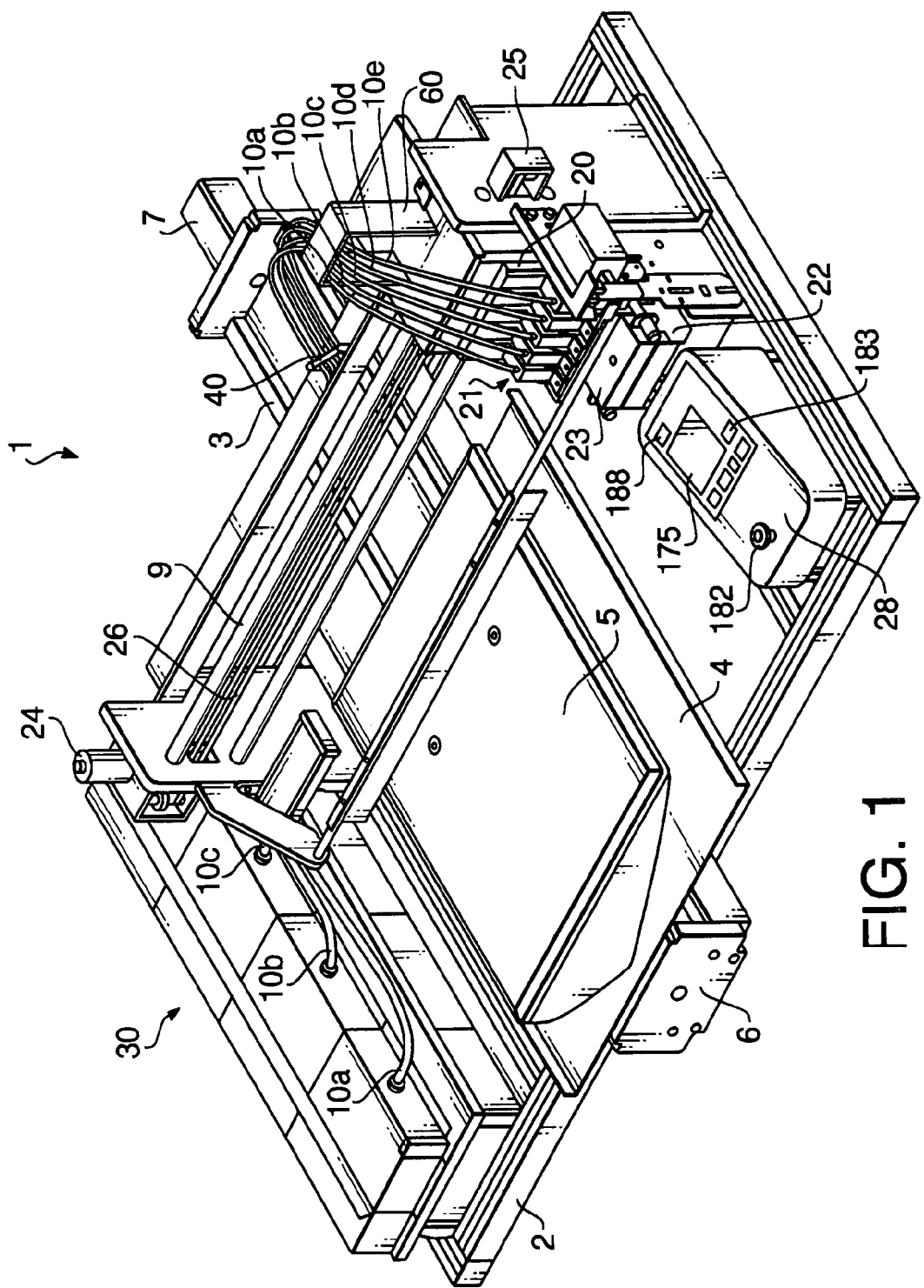
FIG. 1 is a perspective view of an overall configuration of an inkjet printer 1 according to a first embodiment of the invention.

According to an aspect of the present invention, there is provided a print data generating apparatus to generate print data which is used for printing in a printing apparatus based on image data by using a white colorant and at least one non-white colorant. The print data generating apparatus comprises an image data inputting system, whereby white image data indicating white density levels of an image to be printed is inputted, a colorant data generating system, which generates white colorant data wherein color information of each of a plurality of pixels configuring the white image data is converted into the white colorant level, and a print data generating system, which generates white print data to be used for printing with the white colorant in the printing apparatus based on the white colorant data.

According to the above configuration, a user can arbitrarily generate and edit the print data to be used for printing an image in fine reproducibility without being affected by a feature of a recording medium.

Optionally, the print data generating apparatus may comprise a white density level conversion table storing system, wherein a white density level conversion table for converting the white density levels of the plurality of pixels into one-dimensional white colorant levels respectively is stored. The colorant data generating system may generate the white colorant data according to the white image data and the white density level conversion table.

According to the above configuration, the white colorant data wherein the white image data is converted into the white density level, in which the user can visually recognize the density of white color, can be generated.

Optionally, the white image data may represent the image to be printed in a gray scale in one channel.

According to the above configuration, the user can arbitrarily generate and edit the gray-scaled image as the white image data in one channel.

Optionally, the white image data may represent the image to be printed in an RGB format, and each of the plurality of pixels in the white image data may include an R value, an G value, and a B value which in unison represent the color information of the pixel.

According to the above configuration, the user can arbitrarily generate and edit the white image data in the RGB format even when the user uses application software which is incapable of generating and editing image data in the gray scale.

Optionally, the colorant data generating system may obtain the white density level based on a gray-color component included in the R, G, and B values of the each of the plurality of pixels in the white image data.

According to the above configuration, an appropriate white density level can be obtained based solely on the gray-color component in the RGB values even if the pixels in the white image data include color information which is other than a gray-color component in the RGB format.

Optionally, the colorant data generating system may obtain the white density level based on a brightness of the R, G, and B values of the each of the plurality of pixels in the white image data.

According to the above configuration, an appropriate white density level can be obtained based solely on the brightness of the RGB values even if the pixels in the white image data include color information which is other than a gray-color component in the RGB format.

Optionally, the image data inputting system may be used for inputting colored image data representing color information of the image to be printed. The colorant data generating system may generate non-white colorant data wherein color information of each of a plurality of pixels configuring the colored image data is converted into the non-white colorant level. The print data generating system may generate non-white print data to be used for printing with the non-white colorant in the printing apparatus based on the non-white colorant data.

According to the above configuration, the user can generate the white print data for printing in the white colorant by inputting the white image data while the non-white colorant data for printing in the non-white colorant can be generated by inputting the non-white image data.

Optionally, the colorant data generating system may generate the white colorant data based on the white image data and the non-white colorant data based on the colored image data. The print data generating system may generate the print data which is used for printing by using the white colorant and the at least one non-white colorant based on the white colorant data and the non-white colorant data.

According to the above configuration, the user can generate the print data for printing in the white colorant and the non-white colorant by inputting the white image data and the non-white image data.

Optionally, the print data generating apparatus may comprise a white conversion table storing system, which stores a white conversion table defining the white colorant level corresponding to the color information of each of the plurality of pixels that configure the image data. The colorant data generating system may generate the white colorant data in which the color information of the plurality of pixels in the non-white image data is converted into the white colorant level based on the white conversion table when no white image data is inputted through the image data inputting system.

According to the above configuration, the white colorant data can be generated based on the non-white image data which is exclusively inputted by the user.

Optionally, the image data may be comprehensive image data including the white image data and the non-white image data. The colorant data generating system may generate the white colorant data and the non-white colorant data respectively based on the comprehensive image data. The print data generating system may generate the print data which is used for printing by using the white colorant and the at least one non-white colorant based on the white colorant data and the non-white colorant data.

According to the above configuration, the print data for printing in the white colorant and the non-white colorant based on the comprehensive image data as the user inputs the comprehensive image data.

Optionally, the comprehensive image data represents the image to be printed in a CMYK format. Each of the plurality of pixels in the comprehensive image data may include a C value, an M value, a Y value, and a K value which in unison represent the color information of the pixel. The colorant data generating system may generate the white colorant data based on the K value of the plurality of pixels in the comprehensive image data and the non-white colorant data based on the C, M, and Y values of the plurality of pixels in the comprehensive image data.

According to the above configuration, both of the white colorant data and the non-white colorant data can be generated based on the CMYK values in the comprehensive image data.

Optionally, the print data generating apparatus may further comprises a resolution specifying system, which arbitrarily specifies a resolution of the white image data to be printed, and a resolution converting system, which converts the resolution of the white image data into the resolution specified by the resolution specifying system when the resolution is specified by the resolution specifying system.

According to the above configuration, the user can utilize the white image data in a resolution which is different from a resolution of the image to be printed. Therefore, the resolution of the white image can be converted to be a suitable resolution for printing when the white image data is printed.

Optionally, the print data generating apparatus may comprise an offset amount specifying system, wherein an offset amount of an image to be formed on a recording medium by the printing apparatus based on the white image data with respect to the recording medium is specified, and an offset amount adjusting system, wherein the offset amount of the image to be formed on the recording medium based on the white image data with respect to the recording medium is adjusted according to the offset amount specified in the offset amount specifying system when the offset amount of the image is specified in the offset amount specifying system.

According to the above configuration, the user can selectively generate the white image data for an area to be printed in the white colorant while the white image data for the other areas which are not printed in the white colorant is not generated.

Optionally, the print data generating apparatus may further comprise a size specifying system, wherein a size of an image to be formed on a recording medium by the printing apparatus based on the white image data is arbitrarily specified, and a size adjusting system, wherein a shape and a size of the image to be formed on the recording medium based on the white image data are adjusted according to the size specified in the size specifying system when the size of the image to be formed on the recording medium is specified in the size specifying system.

According to the above configuration, the user can adjust the shape and the size of the white image data based on a size of the white image to be printed.

According to another aspect of the present invention, a computer usable medium comprising computer readable instructions for controlling a computer is provided. The computer readable instructions are configured to generate print data which is used for printing in a printing apparatus based on image data by executing steps of inputting white image data indicating white density levels of an image to be printed, generating white colorant data wherein color information of each of a plurality of pixels configuring the white image data is converted into the white colorant level, and generating white print data to be used for printing with the white colorant in the printing apparatus based on the white colorant data.

Embodiment

Hereinafter, referring to accompanying drawings, a first embodiment of the present invention will be described. In the present embodiment, a known personal computer 200 (see FIG. 3), which is connected to a known inkjet printer 1 (see FIGS. 1 and 2), generates print data for printing in the inkjet printer 1.

As shown in FIG. 1, the inkjet printer 1 includes a substantially box-shaped chassis 2 with two rails 3 aligned in parallel with a front-rear direction as indicated by an arrow at an approximate center of a bottom surface thereof. The rails 3 are supported by bases (not shown) which are positioned perpendicularly with respect to the bottom surface of the chassis 2. The rails 3 support a plate as a platen base (not shown) which is movable in the front-rear direction of the chassis along the rails 3. Further, the platen base is provided with a platen mount (not shown) that extends perpendicularly with respect to the platen base at a substantial center the platen base. An exchangeable platen 5 is set on top of the platen mount.

The platen 5 is a substantially rectangular-shaped plate and detachably attached to the platen mount with longer sides thereof aligned in parallel with the front-rear direction of the chassis 2, and clothing fabric as a recording medium is placed on the platen 5. In a position between the platen 5 and the platen base is provided a tray 4, which is fixed to the platen mount, so that a remaining part of the fabric other than the area to be printed such as sleeves of the T-shirt is received thereby and prevented from hanging over the bottom surface of the chassis 2 when the T-shirt is set on the platen 5. A platen drive mechanism 6 includes the rails 3, along which the platen base is carried in the front-rear direction of the chassis 2 by a platen drive motor 7, as the platen motor 7 is provided at a rear end of the platen drive mechanism 6.

At an approximate center of the chassis 2 in the front-rear direction, above the platen 5, a guide rail 9 to guide a carriage 20 with an inkjet head 21 mounted is provided. In vicinity of a left-hand end of the guide rail 9, a carriage motor 24 to drive the carriage 20 is provided, while a pulley 25 is provided in vicinity of a right-hand end of the guide rail 9. Further, a carriage belt 26 is drawn between the carriage motor 24 and the pulley 25 under the guide rail 9. The carriage belt 26 is fixed to a rear surface of the carriage 20 so that the carriage 20 is reciprocated along the guide rail 9 when the carriage motor 24 is activated.

In the inkjet printer 1 according to the present embodiment, white ink, in addition to cyan ink, magenta ink, yellow ink, and black ink, is used for image printing. Therefore, five ink cartridge storage units 30, wherein ink cartridges having the inks therein are detachably attached, are provided on the left-hand side of the inkjet printer 1, and black ink, cyan ink, magenta ink, yellow ink, and white ink are contained in the ink cartridges respectively.

Each ink cartridge storage unit 30 is connected to each of the inkjet heads 21 by ink supplying tubes 10a-10e so that the inks of the five colors stored in the ink cartridges are supplied to each channel of the inkjet heads 21 passing under a guiding member 40 and a tube supporting member 60. The ink supplying tubes 10a-10e are flexible tubes which can be bent and twisted to a certain extent according to the movement of the carriage 20. The guiding member 40 holds the ink supplying tubes 10a-10e behind the carriage 20. The tube supporting member 60 holds the ink supplying tubes 10a-10e as well is provided at an upper surface of the carriage 20.

The carriage 20 is provided with the five piezoelectric inkjet heads 21. Each inkjet head 21 is provided with a plurality of (for example, 128) ejection channels (not shown) through which the ink is conveyed. Each of the channels is provided with a piezoelectric actuator (not shown), which is activated individually, to eject an ink drop downward onto the recording medium from ejection nozzles (not shown) that are open at a nozzle surface of the inkjet head 21. Thus, the inks stored in the ink cartridge storage units 30 are supplied to the inkjet heads 21 through the ink supplying tubes 10a-10e and ejected from the ejection nozzles.

At a position corresponding to the carriage 20 being carried to the right-hand end of the guide rail 9, a purge unit 22 with a suction cap 23, which can be closely attached to and separated from the nozzle surfaces. The purge unit 22 is provided with a suction pump (not shown) so that the inks remaining in the ejection nozzles can be removed therefrom when the suction cap 23 is attached to the nozzle surfaces. Further, when the inkjet printer 1 is not in a printing operation, the nozzle surfaces are covered by the suction cap 23 so that the inks in the nozzle surfaces can be prevented from being dried.

At right-hand front of the chassis 2 is provided an operation panel 28 to which a user inputs an instruction for the inkjet printer 1. The operation panel 28 includes a display 175, a print button 182, a cancel button 183, and a platen feed button 188. As the platen feed button 188 is pressed, the platen 5 is moved to a position wherein the fabric such as a T-shirt as a recording medium can be set on and removed from the platen 5. When the print button 182 is pressed by the user, a printing operation to print the print data received from the personal computer 200 is started. When the cancel button 183 is pressed during the printing operation, the printing operation is canceled.

Figure 2:
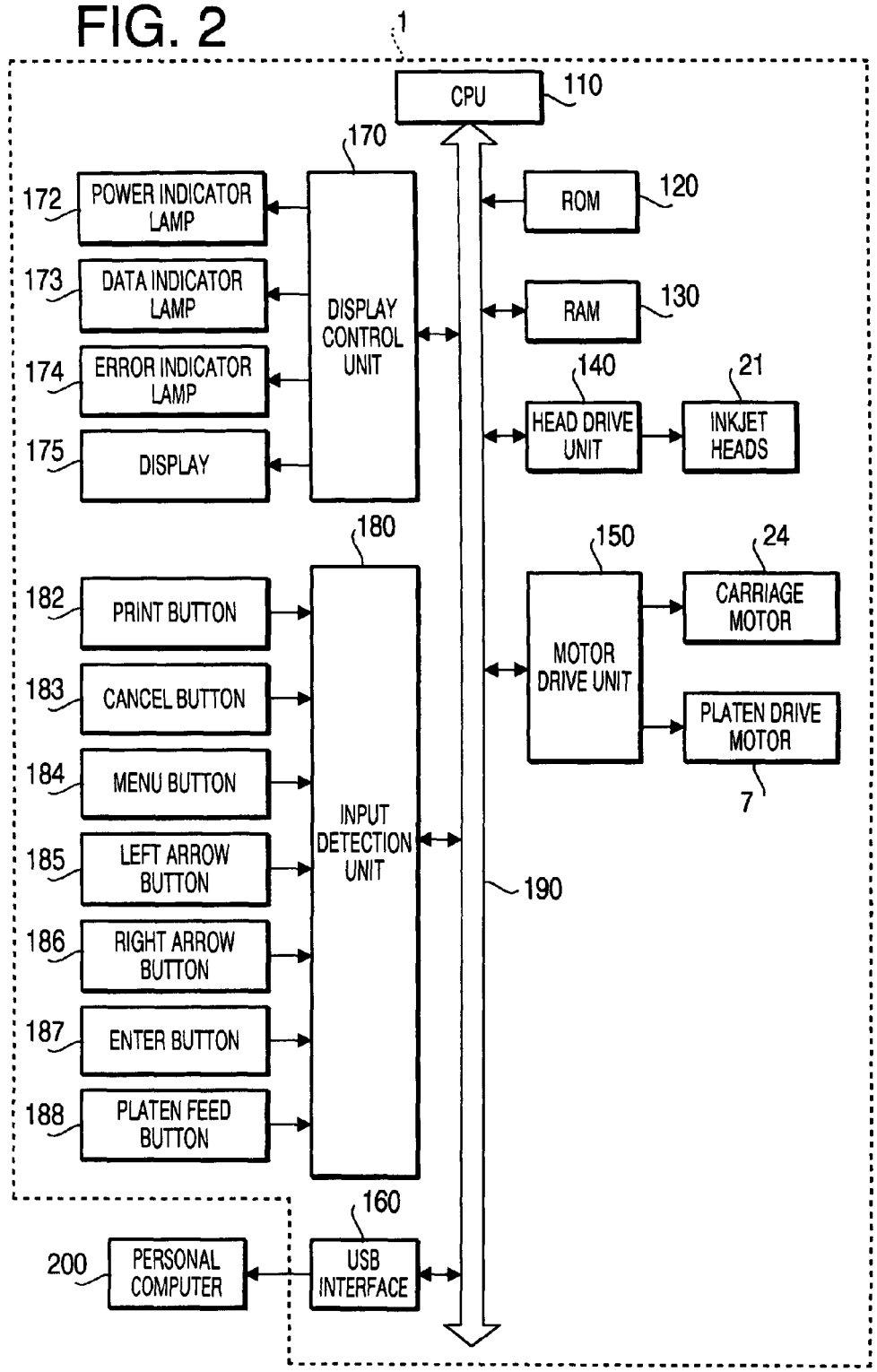
FIG. 2 is a block diagram of an electrical configuration of the inkjet printer 1 according to the first embodiment of the invention.

Next, referring to FIG. 2, an electrical configuration of the inkjet printer 1 will be described. FIG. 2 is a block diagram showing the electrical configuration of the inkjet printer 1 according to the present embodiment of the invention. As shown in FIG. 2, the inkjet printer 1 is provided with a CPU 110 that controls the entire operation in the inkjet printer 1. The CPU 110 is connected with a ROM 120, wherein various information to be used in control programs executed by the CPU 110 is stored, and a RAM 130, wherein various information is temporally stored via a bus 190.

The CPU 110 is further connected with a head drive unit 140, which activates the piezoelectric actuators being provided to each channel of the inkjet head 21 and a motor drive unit 150, which controls a carriage motor 24 and a platen drive motor 7. The carriage motor 24 drives the carriage 20 having the inkjet heads 21, and the platen drive motor 7 drives a platen roller (not shown), which adjusts timing and speed to feed the platen 5 holding the fabric as a recording medium. The CPU 110 is further connected to a USB interface 160, which allows communication between the inkjet printer 1 and external devices including the personal computer 200 through a USB cable (not shown).

The operation panel 28 (see FIG. 1) is provided with the display 175, a power indicator lamp 172, a data indicator lamp 173, and an error indicator lamp 174. A display control unit 170 which executes displaying processes of these indicators is connected to the CPU 110 through the bus 190. Further, the operation panel 28 is provided with a menu button 184, a left arrow button 185, a right arrow button 186, and an Enter button 187, in addition to the print button 182, the cancel button 183, and the platen movement button 188 (see FIG. 1). An input detection unit 180 which executes detecting of these inputs is connected to the CPU 110 through the bus 190.

On the display 175, information regarding the print data such as a name and a size of the data being received from the personal computer 200 is displayed as the CPU 110 is in one of various states such as a receiving state, a print ready state, a printing state, and a print completion state, for example. Also, a menu screen (not shown) to prompt the user's input regarding various settings and details of an error when an error occurs, are displayed on the display 175. When the menu button 184 is pressed, the menu screen is displayed on the display 175, and a cursor shown on the display 175 is moved in left and right as the left arrow button 185 and the right arrow button 186 are pressed. Upon pressing the Enter button 187, an item being selected by the cursor is entered.

The ROM 120 in the inkjet printer 1 is provided with several areas including a program storing area for storing programs such as a control program for controlling an operation of the inkjet printer 1 and a print execution program for executing a printing process, and a program-related information storing area for storing information regarding settings, initial values, and data being necessary for executing the programs.

The RAM 130 in the inkjet printer 1 is provided with several areas including a received print data storing area for storing the print data received from the personal computer 200, an in-printing data storing area for storing the print data being printed, and a setting information storing area for storing various setting information.

Figure 3:
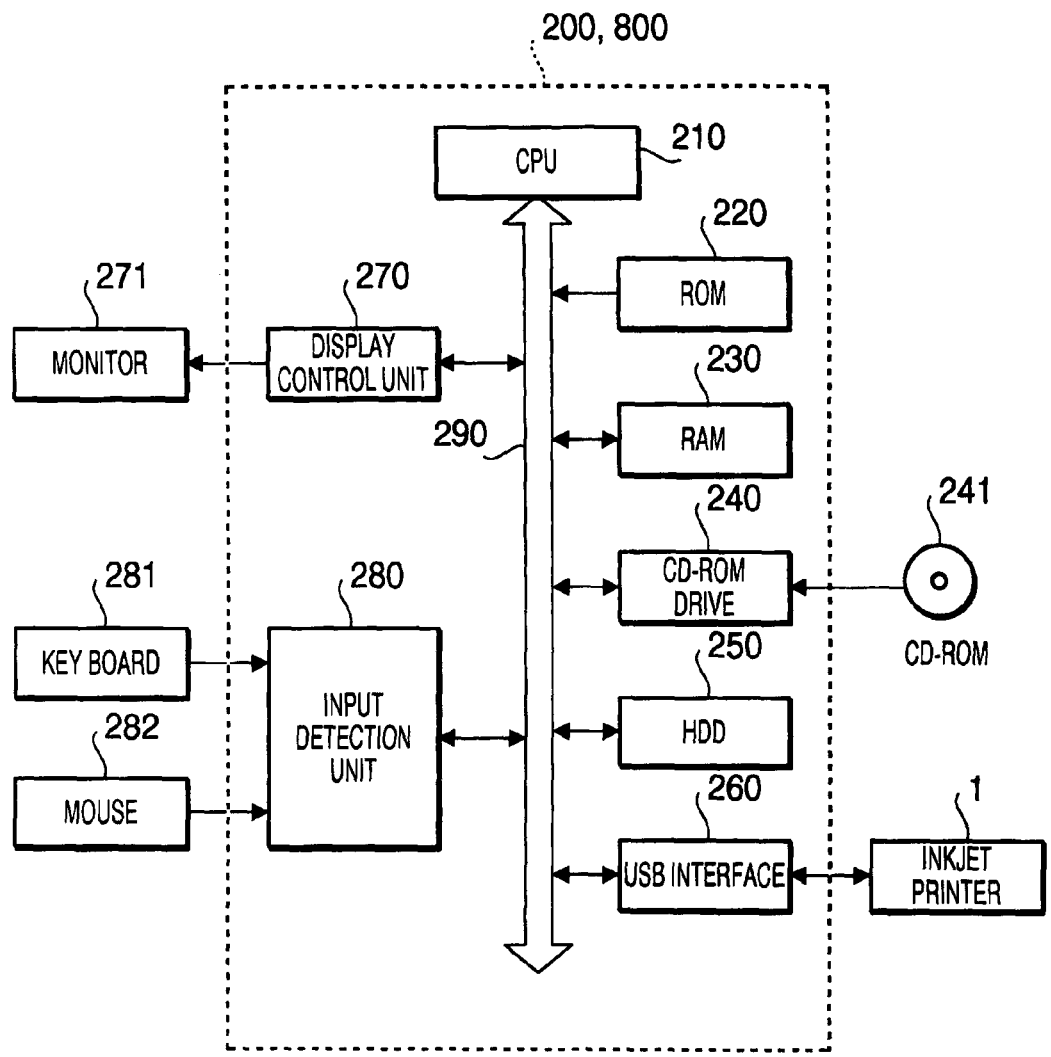
FIG. 3 is a block diagram of an electrical configuration of the personal computer 200 according to the first embodiment of the invention.
Figure 4:
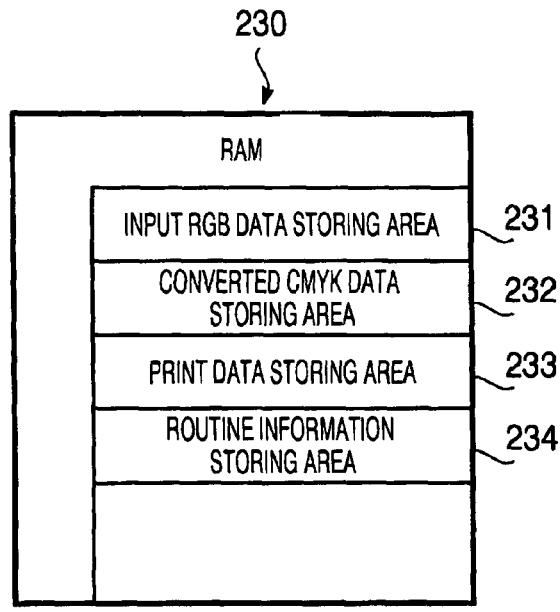
FIG. 4 is a schematic diagram of a RAM 230 in the personal computer 200 according to the first embodiment of the invention.
Figure 5:
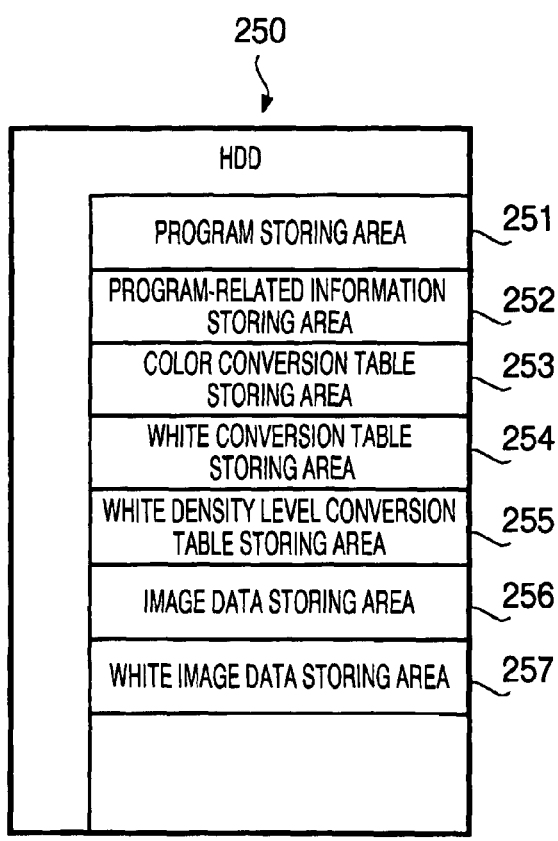
FIG. 5 is a schematic diagram of an HDD (hard disk drive) 250 in the personal computer 200 according to the first embodiment of the invention.

Next, a configuration of the personal computer 200 will be described. FIG. 3 is a block diagram of an electrical configuration of the personal computer 200 according to the present embodiment of the invention. FIG. 4 is a schematic diagram of a RAM 230 in the personal computer 200 according to the present embodiment of the invention. FIG. 5 is a schematic diagram of an HDD 250 in the personal computer 200 according to the present embodiment of the invention. The personal computer 200 is connected to the inkjet printer 1 through a standardized communication cable, for example a USB. In the personal computer 200, print data is generated based on image data created by the user using various applications, and the print data is transmitted to the inkjet printer 1. A process to create the print data will be described in detail hereinafter.

As shown in FIG. 3, the personal computer 200 is provided with a CPU 210 that controls the entire operation in the personal computer 200. The CPU 210 is connected with a ROM 220, wherein various information to be used in controlling programs executed by the CPU 210 is stored, and a RAM 230, wherein various information is temporally stored via a bus 290. Further, a CD-ROM drive 240 for reading data from a CD-ROM 241 inserted therein as a storage medium of data, and the HDD 250 which is a storage unit for data, through a bus 290, are connected to the CPU 210.

The CPU 210 is further connected to a USB interface 260, which allows communication between the personal computer 200 and external devices including the inkjet printer 1 through a USB cable (not shown). The CPU 210 is furthermore connected to a display control unit 270 which executes displaying processes to display an operation screen, input devices including a keyboard 281 and a mouse 282 which are operated by the user, and an input detection unit 280 which executes detecting of these inputs. It should be noted that the personal computer 200 is also provided with other units such as a floppy (registered trademark) disk drive, an audio input-output unit, and various interfaces.

In the CD-ROM 241, printer driver in which a print data generating program is incorporated and information regarding settings and data to be used for executing the program are stored. Such printer driver and the information are stored (copied) from the CD-ROM 241 in a program storing area 251 (see FIG. 5) and a program-related information storing area 252 (see FIG. 5) in the HDD 250, at the time of installation. It should be noted that such information the printer driver for the personal computer 200 and the other information can be obtained in the other method than obtaining from the CD-ROM 241. For example, other recording media such as a flexible disk and an MO (magnet-optical) disk are also available. Further, the information may be obtained from a terminal on a same network by connecting the personal computer 200 to the network.

As shown in FIG. 4, the RAM 230 is provided with several areas including an input image data storing area 231 for temporarily storing input image data (i.e., image data 310 and white image data 311 shown in FIGS. 6 and 7), on which image data is based for creating the print data, a converted CMYKW data storing area 232 for storing converted CMYKW data 340 (see FIGS. 6 and 7), which is converted from the image data 310, a print data storing area 233 for storing print data 350 (see FIGS. 6 and 7), which is created from the converted CMYKW data 340, and a runtime information storing area 234 for storing temporary the other data to be used during execution of other programs.

Figure 10:
FIG. 10 shows a data configuration of a white density level conversion table 430 according to the first embodiment of the invention.
Figure 11:
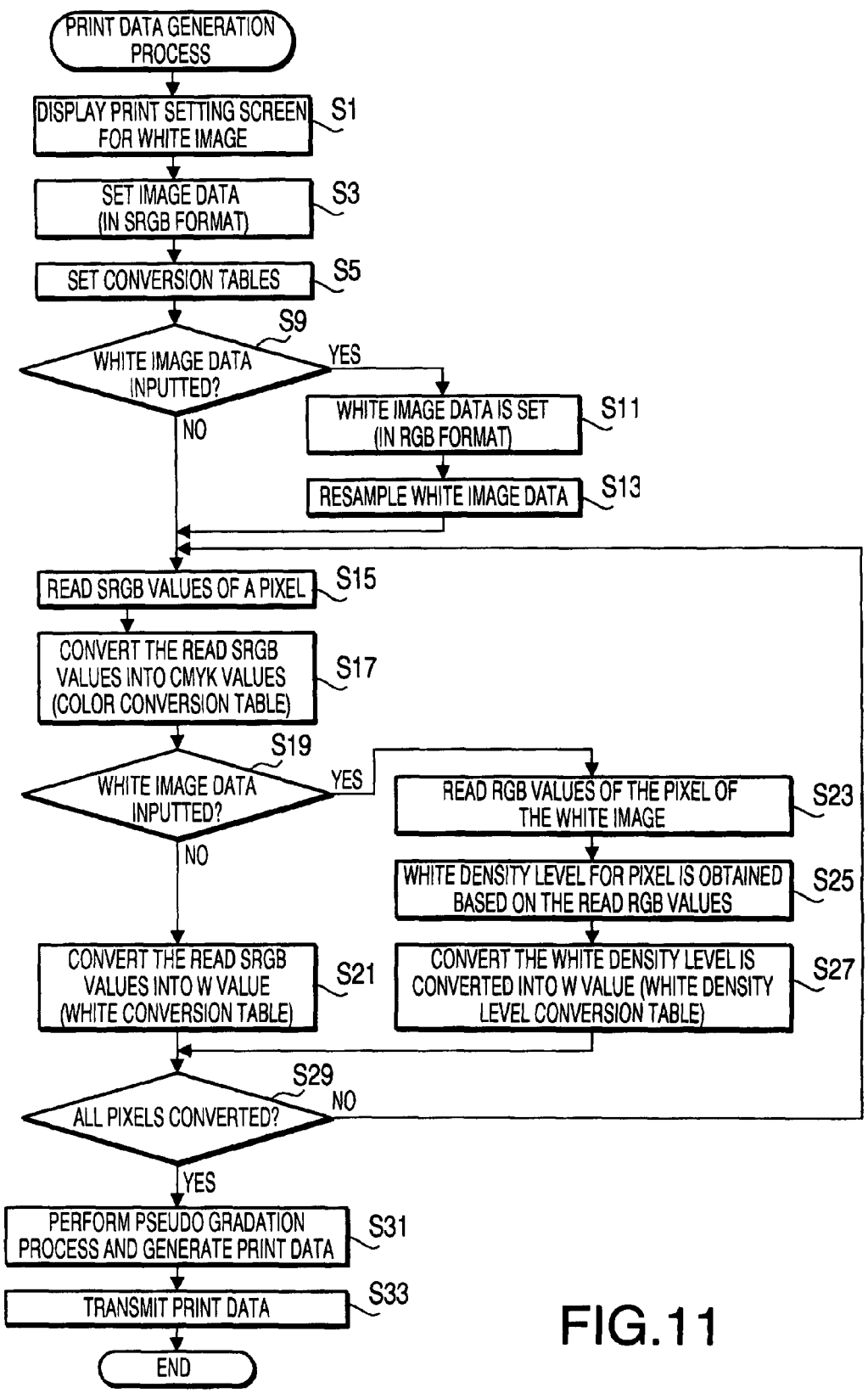
FIG. 11 is a flowchart of a print data generation process according to the first embodiment of the invention.

As shown in FIG. 5, the HDD 250 is provided with several areas including a program storing area 251 for storing various programs to be executed in the personal computer 200 including the printer driver, a program-related information storing area 252 for storing information regarding settings, initial values, and data necessary for executing programs, a color conversion table storing area 253 for storing a color conversion table 410 (see FIGS. 6-8), which is for converting color information of the input image data into a color ink level (i.e., in the CMYK format), a white conversion table storing area 254 for storing a white conversion table 420 (see FIGS. 6 and 9), which is for converting color information of the input image data into a white ink level (i.e., a W format), a white density level conversion table storing area 255 for storing a white density level conversion table 430 (see FIGS. 7 and 10), which is for converting white density of the input data into a white density level (i.e., a W format), an image data storing area 256 for storing a plurality of pieces of image data 310, and a white image data storing area 257 for storing a plurality of pieces of white image data 311 (see FIG. 11).

In the color conversion table storing area 253, a plurality of color conversion tables 410, each of which corresponds to a feature of an image to be printed by the inkjet printer 1 such as a color and a material of the recording medium used, are stored. Similarly, in the white conversion table storing area 254 and the white density level conversion table storing area 255, a plurality of white conversion tables 420 and a plurality of white density level conversion table 430, each of which corresponds to a recording medium to be used by the inkjet printer 1 are respectively stored.

With the aforementioned configuration of the inkjet printer 1 according to the embodiment, as the print data transmitted from the personal computer 200 is received, the user sets a T-shirt on the platen 5 and presses the print button 182. Accordingly, the platen 5 is moved to rearward of the chassis 2 along the rails 3 by the platen driving motor 7 so that the position of the carriage 20 with respect to the platen 5 corresponds to a recording start position. Thereafter, the inkjet heads 21 eject the inks as the carriage 20 is moved from the right-hand side to the left-hand side of the chassis 2 according to a recording instruction so that recording of one line is executed. Further, the platen 5 is moved to frontward from the rearward of the chassis 2 for an amount corresponding to one line, and the inkjet heads 21 eject the inks as the carriage 20 is moved from the right-hand side to the left-hand side of the chassis 2 according to the recording instruction so that recording of the next line is executed. Subsequently, the platen 5 is moved to frontward from the rearward of the chassis 2 for the amount corresponding to another one line portion. By repeating this operation, printing the image onto the T-shirt is executed. At the end of the printing operation, the platen 5 is fed forth to a position wherein the T-shirt can be removed, thus the user removes the T-shirt which underwent the printing operation.

Hereinafter, color reproduction in the personal computer 200 and the inkjet printer 1 will be described. When a color in an area is displayed on the monitor 271 in the personal computer 200, the color of pixels configuring the area is represented in a format called sRGB format. The sRGB is an international standard of color space established by the IEC (International Electrotechnical Commission), and various PC peripherals including digital cameras, printers, and monitors perform color adjustment according to the sRGB to minimize a color difference between the inputted color and output color.

When an image is printed in a printing apparatus such as the inkjet printer 1 by ejecting the inks, a color is reproduced in a format called CMYK format, which is a method of representing colors by using four colors, which are the three primary colors (cyan, magenta, and yellow) and black, and the color is reproduced by a combination of the four values that are C value, M value, Y value, and K value. In order to print the print data represented in this format, inks in the four colors are used in the inkjet printer 1 wherein an ejecting amount of the cyan ink is determined by the C value, an ejecting amount of the magenta ink is determined by the M value, an ejecting amount of the yellow ink is determined by the Y value, and an ejecting amount of the black ink is determined by the K value.

In addition to the four inks, in the present embodiment, even when a base color of the recording medium such as a T-shirt is other than white (e.g. black and blue), in order to suitably print an image in higher reproducibility on a material surface of the recording medium, white ink is used. In this regard, an ejecting amount of the white ink is determined by a W value. Specifically, the color is reproduced in five values of the print data that are the C value, the M value, the Y value, the K value, and W the value, and image printing is executed by using the inks in these five colors.

Thus, in order to print the image based on the image data being displayed on the monitor 271 of the personal computer 200 by the inkjet printer 1, it is required to convert the image data in the sRGB format into print data in the CMYKW format. According to the present embodiment, upon executing a print data generation process (FIG. 11) by the personal computer 200, the print data in the CMYKW format is created based on the image data in sRGB format.

Figure 6:
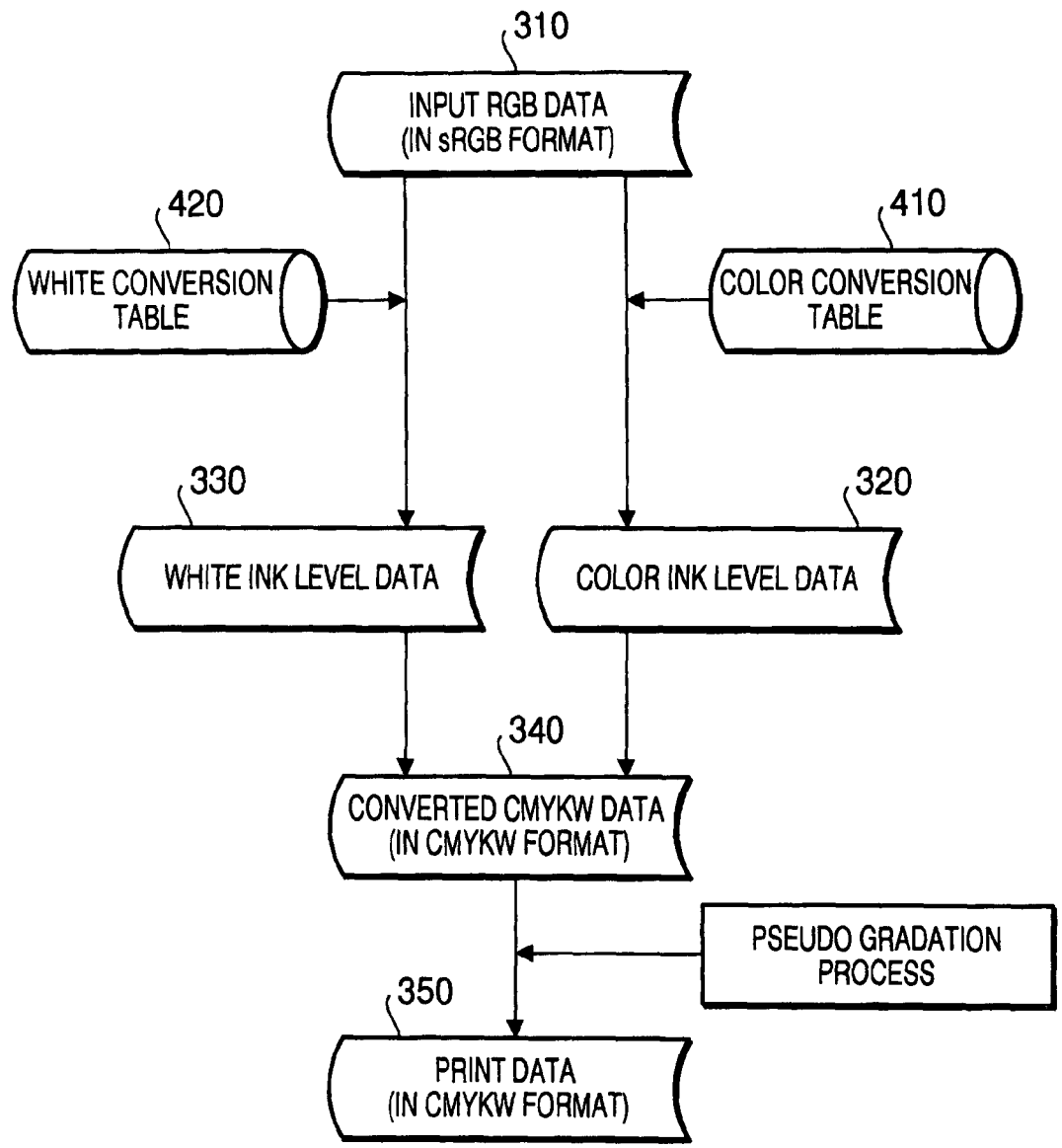
FIG. 6 shows transition of data in a print data generation process according to the first embodiment of the invention.
Figure 7:
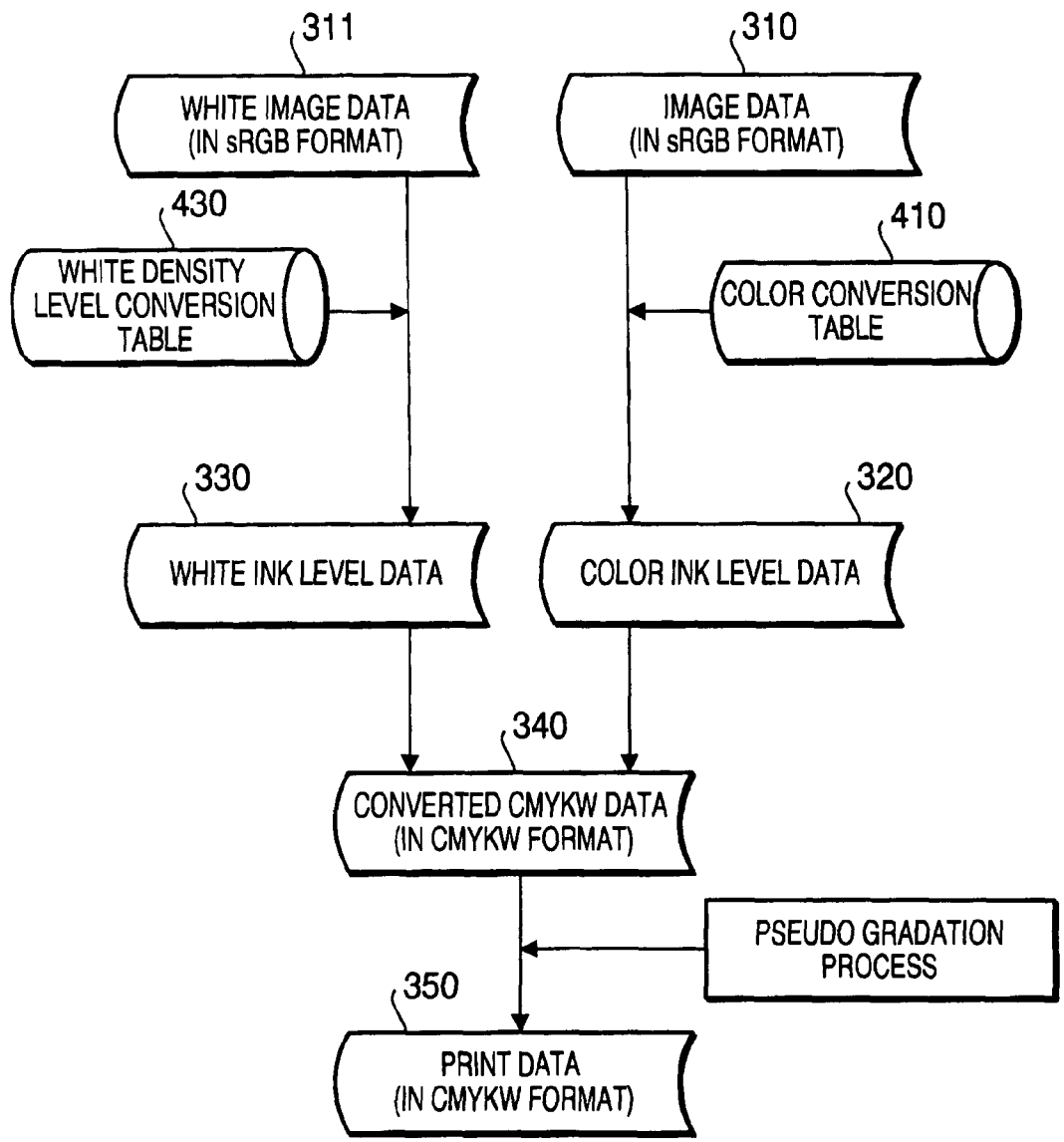
FIG. 7 shows transition of data in a print data generation process according to the first embodiment of the invention.

Hereinafter, the data to be generated in the print data generation process according to the present embodiment will be described. FIGS. 6 and 7 show transition of data in the print data generation process according to the embodiment of the invention. FIG. 8 shows a data configuration of the color conversion table 410. FIG. 9 shows a data configuration of the white conversion table 420 according to the embodiment of the invention. FIG. 10 shows a data configuration of the white density level conversion table 430 according to the embodiment of the invention. In the present embodiment, the recording medium to be printed an image thereon is a T-shirt with a ground color of blue.

In the present embodiment, the print data 350 is generated in one of two processes, which are such that the white ink level data 330 is automatically generated based on the image data 310 and such that the white ink level data 330 is manually generated based on the white image data 311 which is created by the user in advance. Hereinafter, referring to FIGS. 6 and 7, the data transition in the print data generation processes are described.

As shown in FIG. 6, when the white ink level data 330 is automatically generated based on the image data 310, basic data to create print data 350 is the image data 310 stored in the input image data storing area 231 in the RAM 230. The image data 310 is the data which is specified to be printed by the user among a plurality of pieces of image data which have been created by the user using various applications such as an application designed for editing graphics. Thus, the image data 310 is saved in the image data storing area 256 of the HDD 250. Specifically, the image data according to the present embodiment is represented in 256 color scale of the image data in sRGB format.

The color ink level data 320 in the CMYK format is created in a process such that the sRGB values of each pixel which composes the image data 310 are respectively converted into the CMYK values based on the color conversion table 410, which is stored in the color conversion table storing area 253 of the HDD 250. The color conversion table 410 is a table for converting the input data in 256 color scale in the sRGB format into the output data in 256 color scale in the CMYK format. As shown in FIG. 8, each of the CMYK values is defined to correspond to each of the sRGB values respectively. Further, the sRGB values of each pixel which composes the image data 310 are converted into the corresponding CMYK values respectively based on the color conversion table 410. In this regard, in the color conversion table 410, a profile wherein correspondence between the sRGB values and the CMYK values are defined may be arbitrarily created based on a known conversion method.

Also, the white ink level data 330 in W format is created in a process such that the sRGB values of each pixel which composes the image data 310 are converted into the W values respectively based on the white conversion table 420 stored in the white conversion table storing area 254 of the HDD 250. The white conversion table 420 is a table for converting the input data in 256 color scale in the sRGB format into the output data in 256 color scale in W format. As shown in FIG. 9, the W value is defined to correspond to each of the sRGB values respectively. Further, the sRGB values of each pixel which composes the image data 310 are converted into the corresponding W value respectively based on the white conversion table 420. In this regard, in the white conversion table 420, a profile wherein correspondence between the sRGB values and the W values are defined may be arbitrarily created based on a known conversion method.

Thus, the sRGB values of each pixel which composes the image data 310 are converted into the CMYKW values respectively based on the color conversion table 410 and the white conversion table 420. Further, the converted CMYKW data 340 in 256 color scale in the CMYKW format configured with the color ink level data 320 and the white ink level data 330 is stored in the converted CMYKW data storing area 232 of the RAM 230. Additionally, a pseudo gradation process is performed on the converted CMYKW data 340 so that the print data 350 in two-color scale in the CMYKW format is created and stored in the print data storing area 233 in the RAM 230. Lastly, the print data 350 is transmitted to the inkjet printer 1 so as to be used for the image printing on the T-shirt as a recording medium.

As shown in FIG. 7, when the white ink level data 330 is manually generated based on the white image data 311, which has been created by the user in advance, the image data 310 and the white image data 311 stored in the input image data storing area 231 of the RAM 230 are used to create the print data 350. The white image data 311 is specified to be printed by the user among a plurality of pieces of image data which have been created by the user using various applications for editing graphics and stored in the white image data storing area 257 of the HDD 250.

The white image data 311 is bitmap (BMP) image data represented in 256 color scale in the RGB format in which the user can visually recognize density of white in the image to be printed (i.e., an image represented by the image data 310). The white image data 311 is created and edited to correspond to the image data 310 by the user in advance. When the image is printed out on the recording medium, the image data 310 and the white image data 311 as a pair that corresponds to the print data is designated by the user as the input image data.

The color ink level data 320 in the CMYK format is created in a process such that the sRGB values of each pixel which composes the image data 310 are respectively converted into the CMYK values based on the color conversion table 410 (see FIG. 8). Also, the white ink level data 330 in W format is created in a process such that the white density of each pixel which composes the white image data 311 are converted into the W values respectively based on the white density level conversion table 430 stored in the white density level conversion table storing area 255 of the HDD 250. As shown in FIG. 10, the white density level conversion table 430 is a one-dimension table, which is used for converting input data representing density levels in a 256-scale into output data representing the white ink level in a 256-scale. Thus, in the white density level conversion table 430, the W values corresponding to each density level is defined. The white density level of each pixel which composes the white image data 311 is respectively converted into a corresponding W value based on the white density level conversion table 430.

The white density level conversion table 430 is created in advance by the user based on the following measurement results. That is, the white ink levels that ranges from 0 to 255 is divided into nine steps, and sample printing in the white ink in the nine steps is executed on the recording medium, which is the T-shirt with the ground color of blue. Further, the printed output in the nine steps is measured. Next, the measured nine density levels are normalized into a range from 0 to 255. Specifically, when the white ink level is 0, the density level is defined to be 0. Meanwhile, when the white ink level is 255, the density level is defined to be 255 so that a lower white ink level is corresponded to a lower density level and a higher white ink level is corresponded to a higher density level. Thus, the white ink levels in the nine steps and the density levels in the nine steps are inverted, and the density level can be dealt with as the white density level. Furthermore, in an X-Y graph having an X axis for input white ink levels which is normalized in the nine steps ranging from 0 to 255 and a Y axis for an output white density level, the X axis and the Y axis are inverted (Y=X). The inverted X-Y graph has the X axis indicating input white density levels and the Y axis indicating output white ink levels. In the inverted X-Y graph, the intervals between the nine steps in the range from 0 to 255 are linearly interpolated so that one-dimension table defining the correspondence between the white density levels and the white ink levels by sequential values ranging from 0 to 255 is created.

The white density level of each pixel which composes the white image data 311 can be specified by a brightness value which is obtained by the following formula based on RGB values of each pixel.

$$\text{White density level} = 0.6*R + 0.3*G + 0.1*B \qquad \text{[Formula]}$$

As the white density level is obtained by the above formula, a corresponding white ink level (i.e., a W value) can be obtained according to the white density level conversion table 430. Thus, the white density level for each pixel can be converted into the white ink level (i.e., the W value). According to the above-described data conversion, a preferable amount of the white ink to be ejected (i.e., the white ink level) to form the image on the recording medium can be obtained with the white density level based on the white image data 311, in which the user can visually recognize the density of white. Thus, each pixel in the white image data 311 can be converted into a suitable W value.

Thus, the sRGB values of each pixel which composes the image data 310 and the white image data 311 are converted into the CMYKW values respectively based on the color conversion table 410 and the white density level conversion table 430. Further, similarly to the print data generation process shown in FIG. 6, the converted CMYKW data 340 in 256 color scale in the CMYKW format configured with the color ink level data 320 and the white ink level data 330 is stored in the converted CMYKW data storing area 232 of the RAM 230. Additionally, a pseudo gradation process is performed on the converted CMYKW data 340 so that the print data 350 in the two-color scale in the CMYKW format is transmitted to the inkjet printer 1 so as to be used for the image printing on the T-shirt as a recording medium.

Figure 12:
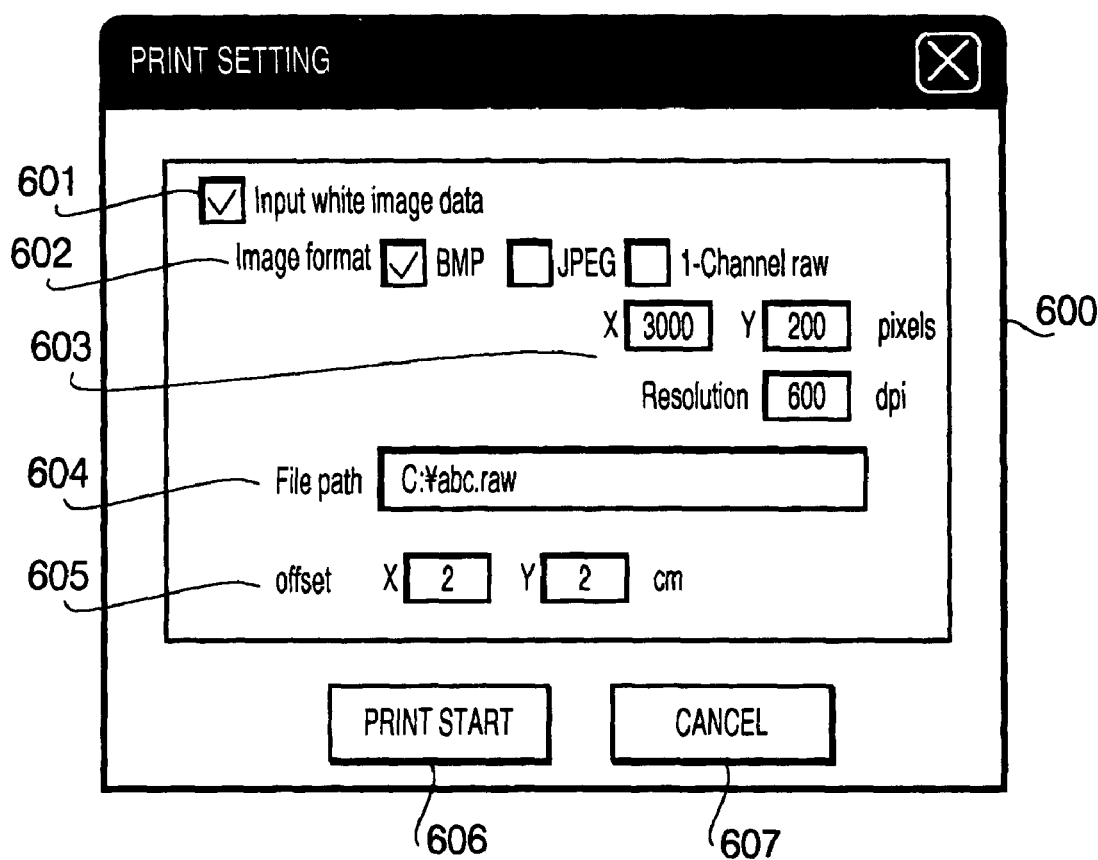
FIG. 12 shows an illustrative embodiment of a print setting screen for white image 600 according to the first embodiment of the invention.

Hereinafter, a print data generation process to be executed in the personal computer 200 for achieving the aforementioned data conversion will be described. FIG. 11 is a flowchart of the print data generation process according to the embodiment of the invention. FIG. 12 shows an illustrative embodiment of a print setting screen for white image 600 according to the embodiment of the invention. According to the present embodiment, when the user instructs to execute printing of the desired image data 310, the printer driver is activated. And the print data generation process is executed by the CPU 210 based on a print data generating program incorporated in the printer driver.

As shown in FIG. 11, in the print data generation process according to the present embodiment, first, the print setting screen for white image 600 is displayed on the monitor 271 as the desired image data 310 is specified to be printed by the user (S1).

As shown in FIG. 12, the print setting screen for white image 600 is a dialogue window wherein the user can arbitrarily specify various settings of the white image data 311 to be printed. The print setting screen for white image 600 is provided, for example, a white image data input checkbox 601 for specifying as to whether the white image data 311 is to be inputted and image format selecting checkboxes 602 for selecting an image format of the white image data 311, and a size and resolution specifying fields 603 for specifying a size and resolution of the white image data 311. Further, the print setting screen for white image 600 includes a file path specifying field 604 wherein a location of a file including the white image data 311 to be read is designated and offset specifying fields 605 wherein an offset amount of the white image data 311 to be printed with respect to the recording medium is specified. Furthermore, a print start button 606 for determining the settings in the print setting screen for white image 600, and a cancel button 607 for canceling the settings in the print setting screen for white image 600 and for terminating the print data generation process (see FIG. 11).

As the print setting screen for white image 600 is displayed, the user inputs arbitrary information to specify the print setting for the white image data 311 by using the input devices such as the keyboard 281 and the mouse 282. If the white image data input checkbox 601 is checked and the print start button 606 is pressed, a white image data input flag (not shown) stored in the RAM 230 is set ON. If the print start button 606 is pressed with the white image data input checkbox 601 being left unchecked, the white image data input flag is set OFF.

Next, the image data 310 to be printed is set (S3). In S3, the image data 310 stored in the image data storing area 256 and specified by the user in S1 is read into the input image data storing area 231. Thereafter, the conversion tables for converting the image data 310 and the white image data 311 are set (S5). In S5, according to the feature such as a color and a material of the recording medium specified by the user, an optimal color conversion table 410 is read from the color conversion table storing area 253, and an optimal white conversion table 420 is read from the white conversion table storing area 254. Further, an optimal white density level conversion table 430 is read from the white density level conversion table storing area 255. In this step, if the white image data input flag is OFF, a color conversion table 410 and a white conversion table 420 are set according to the feature of the blue T-shirt as the recording medium while a color conversion table 410 and the white density level conversion table 430 are set according to the feature of the blue T-shirt if the white image data input flag is ON. The tables to be set in S5 may be arbitrarily specified by the user by using the input device such as the keyboard 281 and the mouse 282.

Next, it is judged as to whether the white image data 311 is to be inputted (S9). Specifically, if the white image data input flag is OFF (S9: NO), it is determined that the white image data 311 is not to be inputted, and the process proceeds to S15.

In S9, if the white image data input flag is ON (S9: YES), the white image data 311 specified to be printed in S1 is set (S11). Specifically, the white image data 311 stored in the white image data storing area 257 and specified by the file path, which is inputted in the file path specifying field 604 of the print setting screen for white image 600, is read in the input image data storing area 231. Further, the white image data 311 is resampled (S13). It should be noted that a process to resample the white image data 311 varies according to the print settings configured in the print setting screen for white image 600 in S1.

More specifically, in S13, if a size (e.g., 3,000×200 pixels in the present embodiment as shown in FIG. 12) and a resolution (e.g., 600 dpi in the present embodiment as shown in FIG. 12) of the image for the white image data 311 to be printed is specified in the resolution specifying fields 603, the white image data 311 is modified into the specified size and the resolution. Further, if an offset position of the white image data 311 to be printed is specified in the offset specifying fields 605 (e.g., 2 cm×2 cm in the present embodiment as shown in FIG. 12), a position of the white image represented by the white image data 311 is modified to the specified offset position. In the present embodiment, "offset" refers to setting a positional relation of the image to be printed and represented by the white image 311 with respect to the image to be printed and represented by the image data 310. A position wherein the white image represented by the white image data 311 starts to be printed is shifted for 2 cm to a right-hand side on the recording medium and for 2 cm to a lower side on the recording medium with respect to the feeding direction of the recording medium.

In case it is determined that the white image data 311 is not to be inputted in S9 (S9: NO), and following S13, the sRGB values for a first pixel which composes the image data 310 set in S3 are read (S15), and the sRGB values read in S15 are converted into the corresponding CMYK values based on the color conversion table 410 set in S5 (S17). For example, according to the color conversion table 410 shown in FIG. 8, when the sRGB values (64, 192, 255) are read in S15, the CMYK values (190, 21, 0, 0) are obtained in S17.

Next, in S19, it is judged as to whether the white image data 311 is to be inputted anew based on the white image data input flag (S19). If the white image data input flag is OFF (S19: NO), the sRGB values read in S15 are converted into the corresponding W value, based on the white conversion table 420 set in S5 (S21). For example, according to the white conversion table 420 shown in FIG. 9, when the sRGB values (64, 192, 255) are read in S15, the W value (251) is obtained in S21. The CMYKW values (190, 21, 0, 0, 251) which are obtained in S17 and S21 are stored in a relevant pixel number field in the converted CMYKW data storing area 232.

In S19, if the white image data input flag is ON (S19: YES), the RGB values for a first pixel which composes the white image data 311 set in S11 are read (S23), and the white density level for the pixel is calculated based on the RGB values read in S23 (S25). In S25, the white density level for the pixel can be calculated based on the brightness value obtained from the RGB values of the pixel as previously described. Next, the white density level obtained in S25 is converted into a corresponding W value according to the white density level conversion table 430 which is set in S5 (S27). For example, according to the white density level conversion table 430 shown in FIG. 10, when the white density level (253) is obtained in S25, the W value (251) is obtained in S27. The CMYKW values (190, 21, 0, 0, 251) which are obtained in S17 and S27 are stored in a relevant pixel number field in the converted CMYKW data storing area 232.

Next, it is judged as to whether all the pixels which compose the image data 310 set in S3 and the white image data 311 set in S11 are converted (S29). If not (S29: NO), the process returns to S15, wherein the sRGB values for a next pixel are read, and the sRGB values of the pixel are converted into the CMYK values (S15-S17). Further, sRGB values of the pixel are converted into a W value (S21). Alternately, RGB values of the next pixel in the white image data 311 is converted into a W value (S23-S27).

In this manner, the steps from S15 to S29 are executed repeatedly until data conversion of all the pixels which compose the image data 310 and the white image data 311 are executed. Therefore, in the converted CMYKW data storing area 232, the color ink level data 320 in the 256 color scale in the CMYK format converted based on the image data 310 in the sRGB format in the 256 color scale and the white ink level data 330 in the 256 color scale in the W format converted based on the image data 310 or the white image data 311 in 256 color scale in the sRGB format are stored. Thus, the converted CMYKW data 340 in the 256 color scale in the CMYKW format is configured with the color ink level data 320 and the white ink level data 330.

In S29, if all the pixels are converted (S29: YES), the converted CMYKW data 340 stored in the converted CMYKW data storing area 232 is converted into the print data 350 in two-color scale in the CMYKW format by a pseudo gradation process (S31). The pseudo gradation process is for binarizing the converted CMYKW data 340 in 256 color scale to down scaled print tone, and the pseudo gradation process is performed by an error diffusion method in the present embodiment. And the print data 350 created in S31 is stored in the print data storing area 233. Thereafter, the print data 350 stored in the print data storing area 233 is transmitted to the inkjet printer 1 (S33), and the process is terminated.

Meanwhile, in the inkjet printer 1 of the present embodiment, upon receiving the print data 350 transmitted from the personal computer 200, the print data 350 is stored in the received print data storing area (not shown) of the RAM 130. When the user presses the print button 182, the print data 350 is read in the in-printing data storing area (not shown), and image printing is executed on the T-shirt as a recording medium based on the print data 350.

In the present embodiment, the five the inkjet heads 21 are arranged in an order of cyan (C), magenta (M), yellow (Y), K (black), and W (white) in a direction from left to right (see FIG. 1). In a one-way printing in the printing operation, the inks are ejected in the order of W, K, Y, M, and C from left to right onto the fabric. Thus, the white ink is ejected onto the fabric ahead of the other four colors of inks (CMYK). As a result, ground color of the fabric such as T-shirt can be covered with the white ink before the image is formed by the colored inks (CMYK) so that the image can be printed in fine reproducibility even if the ground color of the fabric is in a color other than white.

As thus far described, in the personal computer 200 according to the present embodiment, a plurality of input pixels which compose the image data 310 are converted into the color ink level data 320, which is further converted into the CMYK values corresponding to the respective sRGB values based on the color conversion table 410, which is defined by the CMYK values corresponding to the sRGB values. Further, if the white image data 311 is inputted, the white ink level data 330 is generated by converting the input pixels of the white image data 311 into the W values based on the white density level conversion table 430 wherein the white ink levels are defined correspondingly to the white density levels respectively. Meanwhile, if no white image data 311 is inputted, the white ink level data 330 is generated by converting the input pixels of the image data 310 based on the white conversion table 420 wherein the W values are defined correspondingly to sRGB values. Further, the print data 350 which is used for printing in the colored inks (CMYK) and the white ink (W) in the inkjet printer 1 is generated based on the converted CMYKW data which is configured with the color ink level data 320 and the white ink level data 330.

Thus, the print data 350 whereby fine reproducibility can be achieved regardless of the feature of the recording medium can be arbitrarily generated and edited by the user. Further, the user can generate the print data 350 to print the image in the white ink and the colored inks by inputting the arbitrarily generated and edited image data 310 and the white image data 311. In addition, it should be noted that the user can generate the print data 350 by inputting solely the image data 310 (without inputting the white image data 311).

In the present embodiment, the input pixels in the white image data 311 can be converted into the W values according to the white density level conversion table 430. Therefore, the white ink level data 330 indicating the white ink levels which is used for printing in the white ink in the inkjet printer 1 can be generated based on the white image data 311, which can be arbitrarily edited by the user based on the white density levels while the white density levels can be visually recognized by the user. Further, as the white image data 311 is in the RGB format, which can be arbitrarily generated and edited by using application software being incapable of generating and editing image data in the gray scale, the user can arbitrarily generate and edit the white image data 311. Furthermore, the white density level is obtained based on the brightness value which is specified based on the RGB values of the pixels in the white image data 311. Therefore, an appropriate white density level can be obtained based on the brightness of the RGB values even if the pixels in the white image data 311 include color information which is other than a gray-color component in the RGB format. In addition, the white data 311 can be manually arbitrarily edited based on information regarding a resolution, a size, and an offset amount of the white image data 311 to be printed inputted in the print setting screen for white image 600.

Next, referring to FIGS. 13 and 14, a second embodiment of the present invention will be described. A personal computer 800 (see FIG. 3) according to the present embodiment is generally similar to the personal computer 200 in the previous embodiment, except image data to be printed and a method to convert the image data. In the second embodiment, a configuration of the personal computer 800 which is similar to the configuration of the previous embodiment is referred to by an identical reference numeral, and description of that will be omitted.

It should be noted that, in the first embodiment, the color ink level data 320 is generated by converting the image data 310 according to the color conversion table 410 while the white ink level data 330 is generated by converting the image data 310 according to the white conversion table 420 and converting the white image data 311 according to the white density level conversion table 430. However, in the present embodiment, the image data 312 (see FIG. 13) is converted according to the color conversion table 410 and the white density level conversion table 430 to generate both of the color ink level data 320 and the white ink level data 330. Hereinafter, a configuration of the second embodiment being different from the first embodiment will be described. In this regard, it is assumed that the recording medium is a T-shirt having the ground color of blue.

Figure 13:
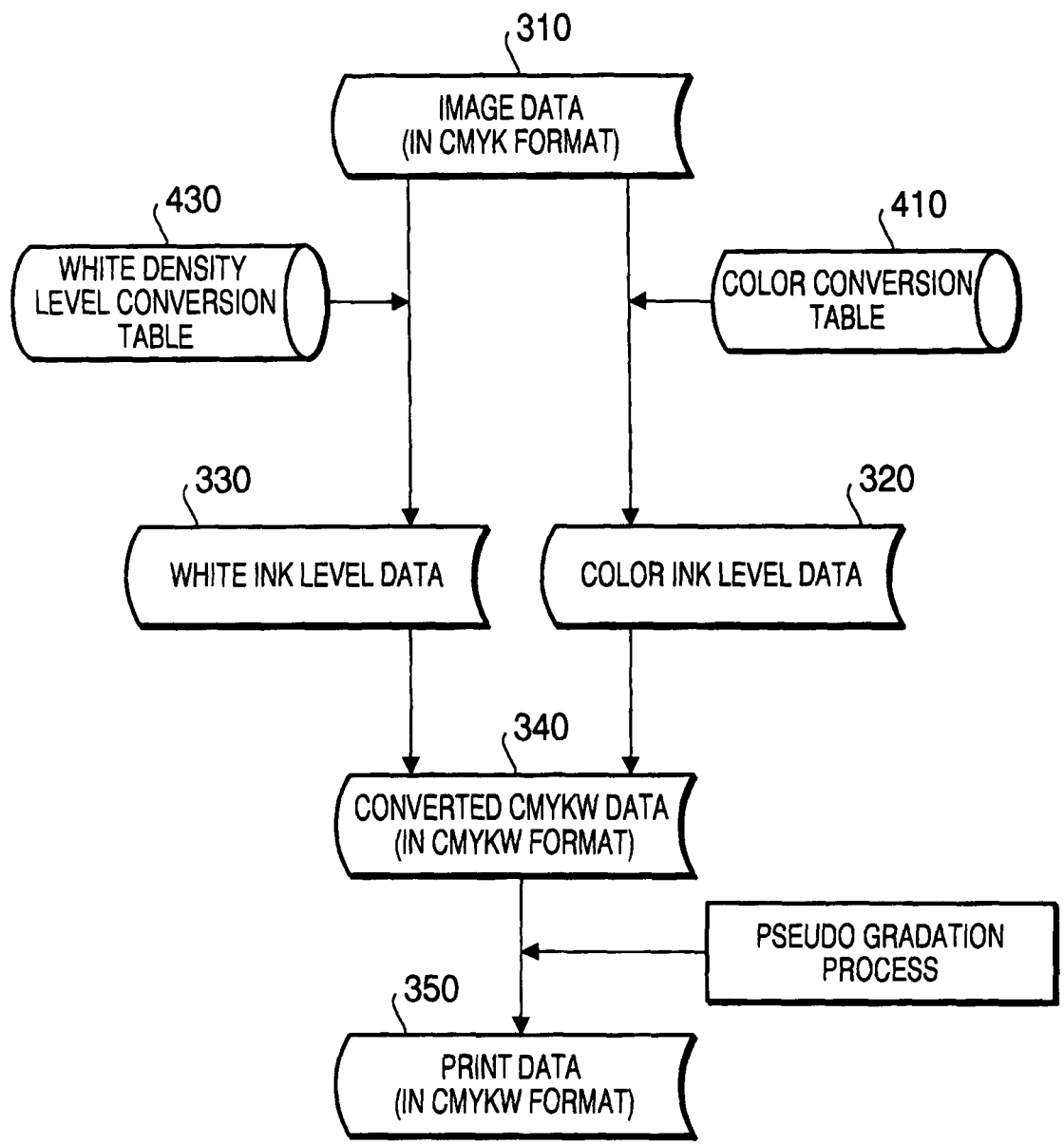
FIG. 13 is a flowchart of a print data generation process according to a second embodiment of the invention.

FIG. 13 is a flowchart of a print data generation process according to the second embodiment of the invention. As shown in FIG. 13, basic data from which the print data 350 is generated is the image data 312 stored in the input image data storing area 231 in the RAM 230. The image data 312 is the data which is specified to be printed by the user among a plurality of pieces of image data which have been saved in the image data storing area 256 of the HDD 250. Specifically, the image data 312 according to the present embodiment is represented in the 256 color scale of the image data in the CMYK format, which is generated and edited by the user to indicate color density of the image to be printed in CMY values and to indicate the white density in K values.

The CMY values of each pixel that composes the image data 312 is converted into the corresponding RGB values respectively. In this regard, each of the C values, M values, and Y values are maintained unchanged to be R values, G values, and B values (i.e., C=R, M=G, Y=B). Further, similarly to the print data generation process described in the first embodiment (see FIG. 7), the RGB values are converted into the CMYK values according to the color conversion table 410 so that the color ink level data 320 in the CMYK format is generated. The color conversion table 410 is a profile wherein correspondence between the sRGB values and the CMYK values are defined.

Also, the K value of each pixel that composes the image data 312 is converted into the corresponding white density level. In this regard, the K value is maintained unchanged to be the white density level (i.e., K=white density level). Further, similarly to the print data generation process described in the first embodiment (see FIG. 7), the white density level is converted into the white ink level (i.e., a W value) according to the white density level conversion table 430 so that the white ink level data 330 in the W format is generated.

Thus, the pixels that compose the image data 312 are respectively converted into the CMYKW values according to the color conversion table 410 and the white density level conversion table 430. Additionally, a pseudo gradation process is performed on the converted CMYKW data 340 including the color ink level data 320 and the white ink level data 330 so that the print data 350 in two-color scale in the CMYKW format is generated and transmitted to the inkjet printer 1.

Hereinafter, a print data generation process to be executed in the personal computer 800 for achieving the aforementioned data conversion will be described. FIG. 14 is a flowchart of the print data generation process according to the present embodiment of the invention. According to the present embodiment, when the user instructs to execute printing of the desired image data 312, the printer driver is activated. And the print data generation process is executed by the CPU 210 based on a print data generating program incorporated in the printer driver.

Figure 14:
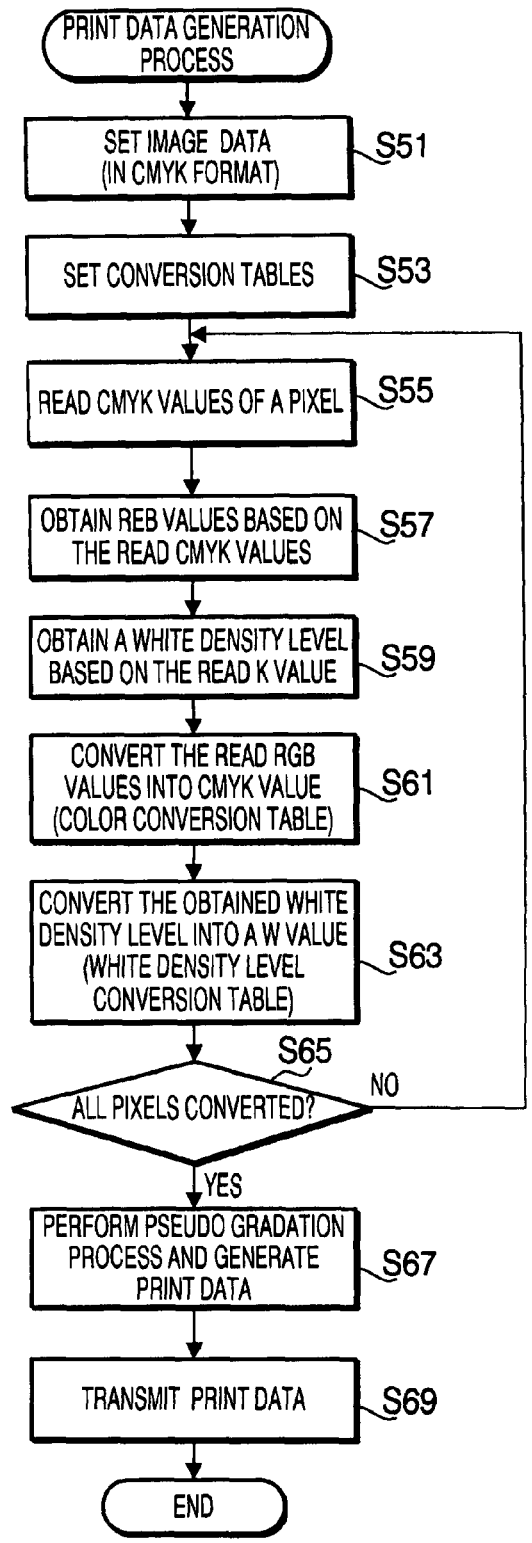
FIG. 14 is a flowchart of a print data generation process according to the second embodiment of the invention.

As shown in FIG. 14, in the print data generation process according to the present embodiment, first, as the desired image data 312 is specified to be printed by the user, the image data 312 is set (S51). In S51, the image data 312 stored in the image data storing area 256 and specified by the user is read into the input image data storing area 231. Next, the conversion tables for converting the image data 312 are set (S53). In S53, according to the feature such as a color and a material of the recording medium specified by the user, an optimal color conversion table 410 is read from the color conversion table storing area 255, and an optimal white density level conversion table 430 is read from the white density level conversion table storing area 255. The tables to be set in S53 may be arbitrarily specified by the user by using the input device such as the keyboard 281 and the mouse 282. Next, the CMYK values for a first pixel which composes the image data 312 set in S51 are read (S55), and the CMYK values read in S55 are converted into the corresponding RGB values (S57). Further, the white density level corresponding to the K value read in S55 is obtained (S59). Thereafter, the RGB values obtained in S57 are converted into corresponding CMYK values according to the color conversion table 410 set in S53 (S61), and the white density level obtained in S59 is converted into the white ink level (i.e., a W value) (S63). The CMYKW values which are obtained in S61 and S63 are stored in a relevant pixel number field in the converted CMYKW data storing area 232.

Next, it is judged as to whether all the pixels which compose the image data 312 set in S51 are converted (S65). If not (S65: NO), the process returns to S55, wherein the CMYK values for a next pixel are read, and the CMYK values of the pixel are converted into the RGB values, the white density level, and ultimately into the CMYKW values (S55-S63).

In this manner, the steps from S55 to S65 are executed repeatedly until data conversion of all the pixels which compose the image data 312 are executed. Therefore, in the converted CMYKW data storing area 232, the color ink level data 320 in the 256 color scale in the CMYK format converted based on the image data 312 in the CMYK format in the 256 color scale and the white ink level data 330 in the 256 color scale in the W format are stored. Thus, the converted CMYKW data 340 in the 256 color scale in the CMYKW format is configured with the color ink level data 320 and the white ink level data 330.

In S65, if all the pixels are converted (S65: YES), the converted CMYKW data 340 stored in the converted CMYKW data storing area 232 is converted into the print data 350 in two-color scale in the CMYKW format by a pseudo gradation process (S67). And the print data 350 created in S67 is stored in the print data storing area 233. Thereafter, the print data 350 stored in the print data storing area 233 is transmitted to the inkjet printer 1 (S69), and the process is terminated.

As thus far described, according to the personal computer 800 of the second embodiment, the image data 312 in the CMYK format is inputted, the CMY values of a pixel in the image data 312 is converted into the RGB values first, and thereafter the color ink level data 320 is generated by converting the RGB values into the CMYK values according to the color conversion table 410. Further, after the K value for the pixel is converted into the white density level, the white ink level data 330 is generated by converting the white density level into the W value according to the white density level conversion table 430. Thereafter, the print data 350 for printing in the colored inks (CMYK) and the white ink (W) in the inkjet printer 1 is generated according to the converted CMYKW data 340 including the color ink level data 320 and the white ink level data 330.

Thus, the print data 350 whereby fine reproducibility can be achieved regardless of the feature of the recording medium can be arbitrarily generated and edited by the user. Further, the user can generate the print data 350 to print the image in the white ink and the colored inks by inputting the arbitrarily generated and edited image data 310. Specifically, it should be noted that the image data 312 is in the CMYK format having the K value on which the white ink level data 330 is based and the CMY values on which the color ink level data is based when the print data 350 for printing the image in the colored inks and the white ink is generated by inputting the image data 312 solely.

Although examples of carrying out the invention have been described, those skilled in the art will appreciate that there are numerous variations and permutations of the inkjet printer that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the embodiments described above, the blue T-shirt is used as a recording medium, however, the present invention may be applied also to another recording medium such as recording paper and labels. Further, the ground color is not limited to blue, but different colors such as red and black as well as white are also available. Furthermore, the inkjet printer 1 may be replaced with another printing apparatus that records an image on a recording medium in the other recording methods, such as laser printing using toner.

In the embodiments described above, the white image data 311 is bitmap (BMP) image data represented in 256 color scale in the RGB format. However, the color scale and the data format may be replaced with another format arbitrarily. In addition, the white density level conversion table 430 may be generated and edited arbitrarily by the user as long as the white density levels and the white ink levels (i.e., W values) are defined to correspond to each other.

In the embodiments described above, the color conversion table 410 and the white conversion table 420 are used for converting image data in the sRGB format into print data in the CMYKW format, however, different data formats may be arbitrarily selected. For example, the image data may be data on the other color space such as the CMYK format and the HSV format, and the print data may be data in the other color space such the RGB format and the HSV format depending on the recording method of the printer being used. In addition, the color conversion table 410 and the white conversion table 420 may be modified as long as correspondence of data format is defined so that the image data and the print data are convertible.

In the first embodiment, as the white density level is obtained in S25 in the print data generation process (see FIG. 11), the white density level is obtained based on the brightness value which is specified by the RGB values of the pixels in the white image data 311. However, a method to obtain the white density level can be replaced with another. For example, the white density level may be obtained based on a gray-color component in the RGB values of the pixels in the white image data 311. In this regard, minimum values for an R value, a G value, and a B value are set according to the following formula, i.e., a white density level=Min(R, G, B). In this method, an appropriate white density level can be obtained based on the brightness of the RGB values even if the pixels in the white image data 311 includes color information which is other than a gray-color component in the RGB format.

Furthermore, in S25, the method to obtain the white density level can be altered according to the configuration specified in the image format selecting checkboxes 602 of the print setting screen for white image 600 (see FIG. 12). For example, when a checkbox for "1-channeled raw" is checked, the RGB values of the pixels may be maintained unchanged to be the white density levels.

When an offset position is specified in the offset specifying fields 605 of the print setting screen for white image 600, and the positional relation between the image data 310 and the white image data 311 can be properly adjusted to generate the print data 350, various known methods may be employed. For example, as the image data 350 is generated, the image data 310 and the white image data 311 are arranged in data in an RGBW format in an area to be printed, so that the print data 350 can be generated based on the data in the RGBW format.

In the second embodiment, it is possible to generate the color ink level data 320 and the white ink level data 330 based solely on the image data 312. Therefore, the screen to specify the white image data 311 (i.e., the print setting screen for white image 600) is not displayed. However, a similar screen may be displayed so that the user can thereby specify settings for the image data 312 such as a resolution, a size, and an image format.

Further, in the second embodiment, the CMYK values of each pixel that composes the image data 312 are converted as R=C, G=M, B=Y, the white density level=K. However, a data conversion method is not limited to this, but may be replaced with another. For example, each of the RGB values and the white density level may be obtained by subtracting the C, M, Y, K values respectively from predetermined values (for example, maximum values of the ink levels. In this case, R=255-C, G=255-M, B=255-Y, the white density level=255-K). Furthermore, the white density level may be obtained without using the white density level conversion table 430 by maintaining the K values to be the W values unchanged (i.e., W=K).

What is claimed is:
1. A print data generating apparatus to generate print data which is used for printing in a printing apparatus based on image data by using a white colorant and at least one non-white colorant, comprising:
an image data inputting system, whereby white image data indicating white density levels of an image to be printed is inputted;
a colorant data generating system, which generates white colorant data wherein color information of each of a plurality of pixels configuring the white image data is converted into the white colorant level;

a print data generating system, which generates white print data to be used for printing with the white colorant in the printing apparatus based on the white colorant data; and a white density level conversion table storing system, wherein a white density level conversion table for converting the white density levels of the plurality of pixels into one-dimensional white colorant levels respectively is stored; wherein:

the colorant data generating system generates the white colorant data according to the white image data and the white density level conversion table, the white image data represents the image to be printed in an RGB format, each of the plurality of pixels in the white image data includes an R value, a G value, and a B value which in unison represent the color information of the pixel, and the colorant data generating system obtains the white density level based on a brightness determined by the R, G, and B values of the each of the plurality of pixels in the white image data.

2. The print data generating apparatus according to claim 1, wherein the white image data represents the image to be printed in a gray scale in one channel.

3. The print data generating apparatus according to claim 1, wherein the image data inputting system is used for inputting colored image data representing color information of the image to be printed;

wherein the colorant data generating system generates non-white colorant data wherein color information of each of a plurality of pixels configuring the colored image data is converted into the non-white colorant level; and wherein the print data generating system generates non-white print data to be used for printing with the non-white colorant in the printing apparatus based on the non-white colorant data.

4. The print data generating apparatus according to claim 3, wherein the colorant data generating system generates the white colorant data based on the white image data and the non-white colorant data based on the colored image data;

wherein the print data generating system generates the print data which is used for printing by using the white colorant and the at least one non-white colorant based on the white colorant data and the non-white colorant data.

5. The print data generating apparatus according to claim 4, comprising:

a white conversion table storing system, which stores a white conversion table defining the white colorant level corresponding to the color information of each of the plurality of pixels that configure the image data;

wherein the colorant data generating system generates the white colorant data in which the color information of the plurality of pixels in the non-white image data is converted into the white colorant level based on the white conversion table when no white image data is inputted through the image data inputting system.

6. The print data generating system according to claim 3, wherein the image data is comprehensive image data including the white image data and the non-white image data;

wherein the colorant data generating system generates the white colorant data and the non-white colorant data respectively based on the comprehensive image data; and wherein the print data generating system generates the print data which is used for printing by using the white colorant and the at least one non-white colorant based on the white colorant data and the non-white colorant data.

7. The print data generating apparatus according to claim 6, wherein the comprehensive image data represents the image to be printed in a CMYK format;

wherein each of the plurality of pixels in the comprehensive image data includes a C value, an M value, a Y value, and a K value which in unison represent the color information of the pixel;

wherein the colorant data generating system generates the white colorant data based on the K value of the plurality of pixels in the comprehensive image data and the non-white colorant data based on the C, M, and Y values of the plurality of pixels in the comprehensive image data.

8. The print data generating apparatus according to claim 1, further comprising:

a resolution specifying system, which arbitrarily specifies a resolution of the white image data to be printed; and a resolution converting system, which converts the resolution of the white image data into the resolution specified by the resolution specifying system when the resolution is specified by the resolution specifying system.

9. The print data generating apparatus according to claim 1, comprising:

an offset amount specifying system, wherein an offset amount of an image to be formed on a recording medium by the printing apparatus based on the white image data with respect to the recording medium is specified, and an offset amount adjusting system, wherein the offset amount of the image to be formed on the recording medium based on the white image data with respect to the recording medium is adjusted according to the offset amount specified in the offset amount specifying system when the offset amount of the image is specified in the offset amount specifying system.

10. The print data generating apparatus according to claim 1, further comprising:

a size specifying system, wherein a size of an image to be formed on a recording medium by the printing apparatus based on the white image data is arbitrarily specified; and a size adjusting system, wherein a shape and a size of the image to be formed on the recording medium based on the white image data are adjusted according to the size specified in the size specifying system when the size of the image to be formed on the recording medium is specified in the size specifying system.

11. A print data generating apparatus to generate print data which is used for printing in a printing apparatus based on image data by using a white colorant and at least one non-white colorant, comprising:

an image data inputting system, whereby white image data indicating white density levels of an image to be printed is inputted;

a colorant data generating system, which generates white colorant data wherein color information of each of a plurality of pixels configuring the white image data is converted into the white colorant level;

a print data generating system, which generates white print data to be used for printing with the white colorant in the printing apparatus based on the white colorant data, and a white density level conversion table storing system, wherein a white density level conversion table for converting the white density levels of the plurality of pixels into one-dimensional white colorant levels respectively is stored; wherein:

the colorant data generating system generates the white colorant data according to the white image data and the white density level conversion table, the white image data represents the image to be printed in an RGB format, each of the plurality of pixels in the white image data includes an R value, a G value, and a B value which in unison represent the color information of the pixel, and the colorant data generating system obtains the white density level based on a gray-color component defined by the R, G, and B values of the each of the plurality of pixels in the white image data.

12. A non-transitory computer usable medium comprising computer readable instructions for controlling a computer to generate print data, which is used for printing in a printing apparatus based on image data, by executing steps of:

inputting white image data indicating white density levels of an image to be printed;

generating white colorant data wherein color information of each of a plurality of pixels configuring the white image data is converted into the white colorant level; and generating white print data to be used for printing with the white colorant in the printing apparatus based on the white colorant data; and storing a white density level conversion table for converting the white density levels of the plurality of pixels into one-dimensional white colorant levels respectively;

wherein:

the white colorant data is generated according to the white image data and the white density level conversion table, the white image data represents the image to be printed in an RGB format, each of the plurality of pixels in the white image data includes an R value, a G value, and a B value which in unison represent the color information of the pixel, and the colorant data generating system obtains the white density level based on a brightness determined by the R, G, and B values of the each of the plurality of pixels in the white image data.

* * * * *